United States Patent
Plummer et al.

(10) Patent No.: US 12,070,892 B2
(45) Date of Patent: Aug. 27, 2024

(54) CONSTRAINED FORMING OF CONTOURED COMPOSITE HAT STRINGERS

(71) Applicant: The Boeing Company, Arlington, VA (US)

(72) Inventors: Steven Joseph Plummer, Seattle, WA (US); Kurtis Shuldberg Willden, Kent, WA (US); Megan E. Bliss, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 18/306,432

(22) Filed: Apr. 25, 2023

(65) Prior Publication Data

US 2023/0256663 A1    Aug. 17, 2023

Related U.S. Application Data

(62) Division of application No. 17/447,593, filed on Sep. 14, 2021, now abandoned.

(60) Provisional application No. 63/079,805, filed on Sep. 17, 2020.

(51) Int. Cl.

| | |
|---|---|
| B29C 70/56 | (2006.01) |
| B29C 51/00 | (2006.01) |
| B29C 51/08 | (2006.01) |
| B29C 51/20 | (2006.01) |
| B29C 51/28 | (2006.01) |
| B29C 70/28 | (2006.01) |
| B29C 70/46 | (2006.01) |
| B29L 31/00 | (2006.01) |
| B29L 31/30 | (2006.01) |

(52) U.S. Cl.
CPC ............ *B29C 51/28* (2013.01); *B29C 51/004* (2013.01); *B29C 51/087* (2013.01); *B29C 51/20* (2013.01); *B29C 70/462* (2013.01); *B29K 2821/00* (2013.01); *B29K 2995/0082* (2013.01); *B29L 2031/003* (2013.01); *B29L 2031/3082* (2013.01)

(58) Field of Classification Search
CPC ..... B29C 70/541; B29C 70/543; B29C 70/56; B29C 70/345; B29C 70/446; B29C 70/462

See application file for complete search history.

(56) References Cited

U.S. PATENT DOCUMENTS

| | | |
|---|---|---|
| 2,484,288 A | 10/1949 | Hamm |
| 4,548,859 A | 10/1985 | Kline et al. |
| 5,378,134 A | 1/1995 | Blot et al. |

(Continued)

FOREIGN PATENT DOCUMENTS

| | | |
|---|---|---|
| EP | 1393875 A1 | 3/2004 |
| EP | 2170699 B1 | 2/2012 |

(Continued)

OTHER PUBLICATIONS

Notice of Allowance, dated Jun. 20, 2023, regarding U.S. Appl. No. 17/447,591, 24 pages.

(Continued)

*Primary Examiner* — Matthew J Daniels
(74) *Attorney, Agent, or Firm* — Yee & Associates, P.C.

(57) ABSTRACT

Cap wrinkling in a contoured composite hat stringer is reduced by constraining the cap as the hat stringer is being formed from a flat composite charge. The cap is constrained by an inflatable bladder placed in a tool set used to form the composite charge.

20 Claims, 8 Drawing Sheets

(56) References Cited

U.S. PATENT DOCUMENTS

| | | | |
|---|---|---|---|
| 7,357,166 | B2 | 4/2008 | Pham et al. |
| 8,465,613 | B2 | 6/2013 | Rotter et al. |
| 8,557,165 | B2 | 10/2013 | Jones et al. |
| 8,997,642 | B2 | 4/2015 | Stewart et al. |
| 9,162,396 | B2 | 10/2015 | Coxon et al. |
| 9,272,767 | B2 | 3/2016 | Stewart |
| 9,387,628 | B2 | 7/2016 | Chapman et al. |
| 9,782,960 | B1 | 10/2017 | Roins et al. |
| 10,315,750 | B2 | 6/2019 | Stewart |
| 10,369,740 | B2 * | 8/2019 | Chapman .............. B29C 70/541 |
| 10,399,283 | B2 | 9/2019 | Offensend et al. |
| 10,456,960 | B2 | 10/2019 | Chapman et al. |
| 2004/0043196 | A1 * | 3/2004 | Willden ................. B29C 43/18 428/174 |
| 2010/0102482 | A1 | 4/2010 | Jones et al. |
| 2010/0225016 | A1 | 9/2010 | Prebil et al. |
| 2011/0127698 | A1 | 6/2011 | Alenby et al. |
| 2013/0092323 | A1 | 4/2013 | Pham et al. |
| 2013/0340928 | A1 | 12/2013 | Rotter et al. |
| 2014/0103585 | A1 | 4/2014 | Coxon et al. |
| 2014/0314996 | A1 | 10/2014 | Stewart |
| 2016/0016366 | A1 | 1/2016 | Robins et al. |
| 2016/0023409 | A1 * | 1/2016 | Coxon ............... B29D 99/0003 425/167 |
| 2016/0339682 | A1 | 11/2016 | Bahe et al. |
| 2017/0021534 | A1 * | 1/2017 | Chapman ............. B29C 70/541 |
| 2017/0057100 | A1 | 3/2017 | Shaw et al. |
| 2017/0095986 | A1 | 4/2017 | Feigenblum et al. |
| 2019/0291306 | A1 | 9/2019 | Hannan et al. |
| 2020/0231267 | A1 | 7/2020 | Rotter et al. |
| 2021/0107238 | A1 | 4/2021 | Saini et al. |
| 2021/0107239 | A1 | 4/2021 | Saini et al. |
| 2022/0080649 | A1 | 3/2022 | Plummer et al. |
| 2022/0080680 | A1 | 3/2022 | Plummer et al. |
| 2022/0080683 | A1 | 3/2022 | Plummer et al. |

FOREIGN PATENT DOCUMENTS

| | | |
|---|---|---|
| EP | 3115185 A1 | 1/2017 |
| EP | 3162544 A1 | 5/2017 |
| EP | 3628472 A1 | 4/2020 |
| EP | 3677397 A1 | 7/2020 |
| EP | 3693155 A1 | 8/2020 |
| EP | 3708347 A1 | 9/2020 |

OTHER PUBLICATIONS

Final Office Action, dated Sep. 12, 2023, regarding U.S. Appl. No. 17/447,595, 20 pages.
Advisory Action dated Nov. 16, 2023 regarding U.S. Appl. No. 17/447,595, 13 pages.
Office Action dated Jan. 18, 2024, regarding U.S. Appl. No. 17/447,595, 28 pages.
European Patent Office Extended Search Report, dated Dec. 1, 2021, regarding EP Application No. 21180643.5, 8 pages.
European Patent Office Extended Search Report, dated Dec. 17, 2021, regarding EP Application No. 21183660.6, 8 pages.
European Patent Office Extended Search Report, dated Feb. 11, 2022, regarding EP Application No. 21192330.5, 6 pages.
EPO. "European Search Report for EP 3970955 A 1 ". EPO. Espacenet. 2023 (Year: 2023).
Office Action, dated Nov. 29, 2022, regarding U.S. Appl. No. 17/447,593, 28 pages.
Office Action, dated Feb. 17, 2023, regarding U.S. Appl. No. 17/447,591, 19 pages.
Final Office Action, dated Feb. 21, 2023, regarding U.S. Appl. No. 17/447,593, 9 pages.
Office Action, dated Apr. 19, 2023, regarding U.S. Appl. No. 17/447,595, 45 pages.

* cited by examiner

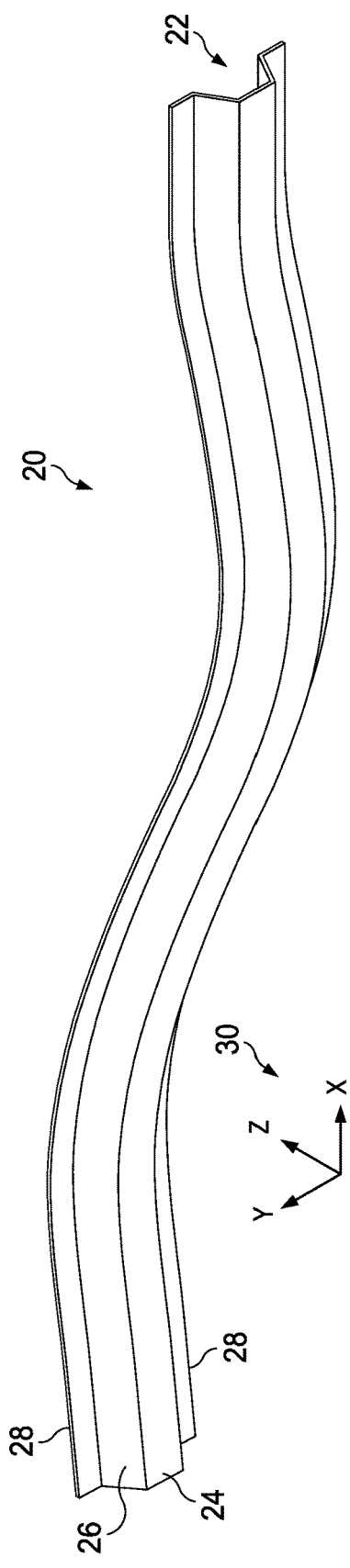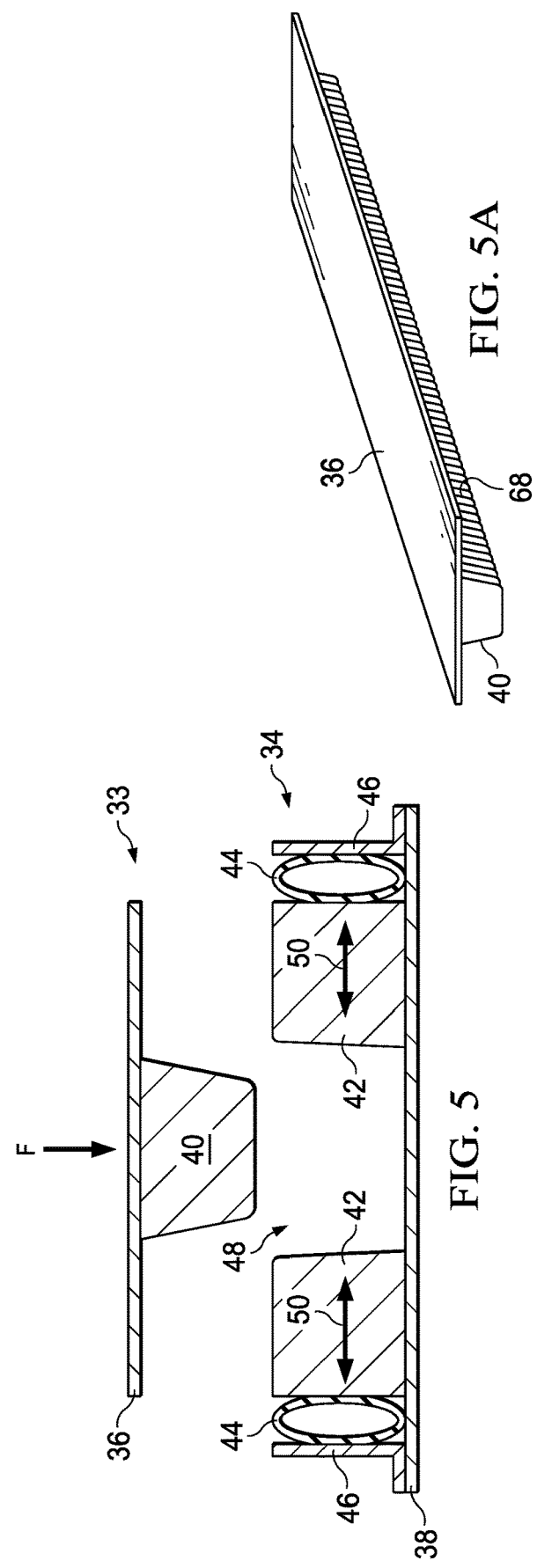

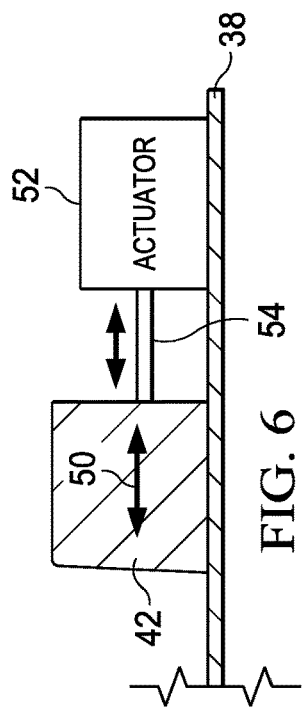
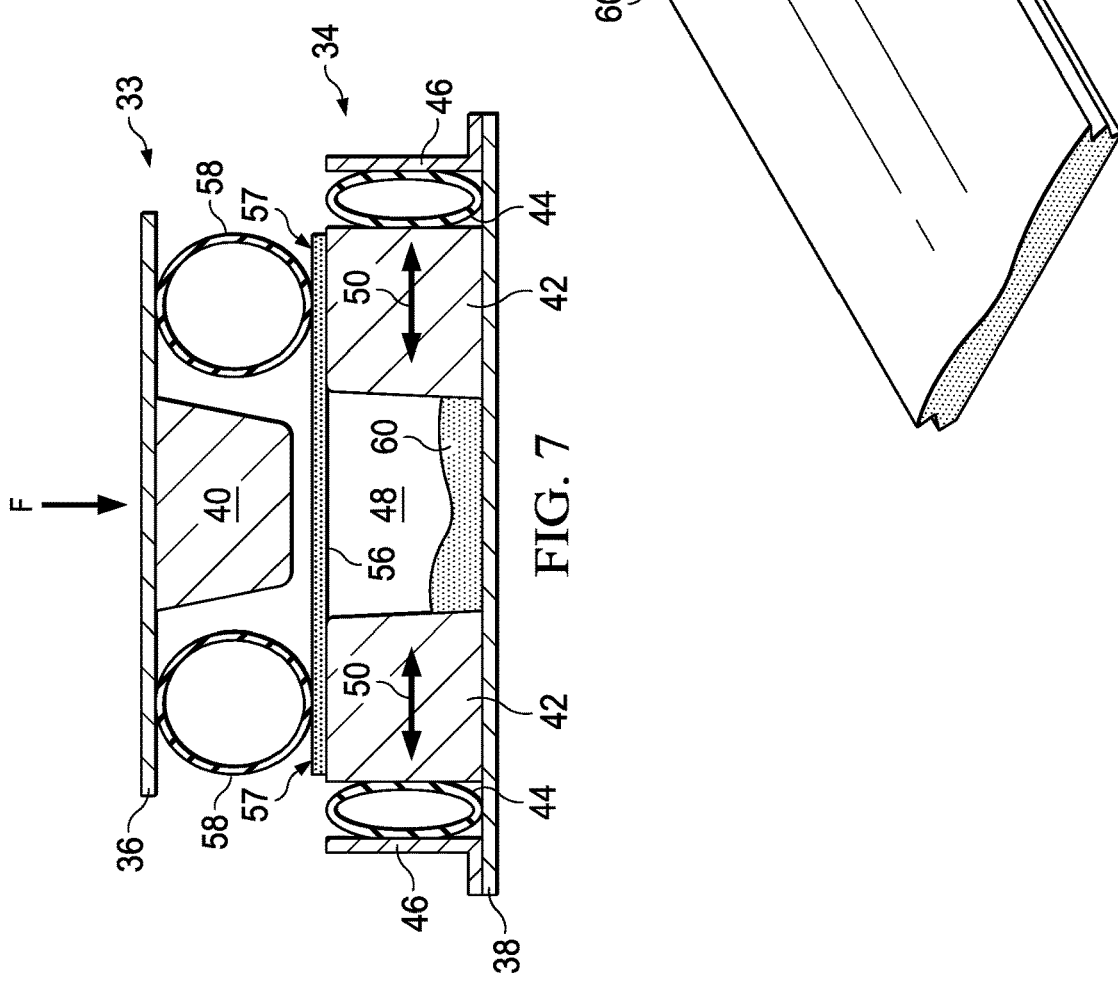

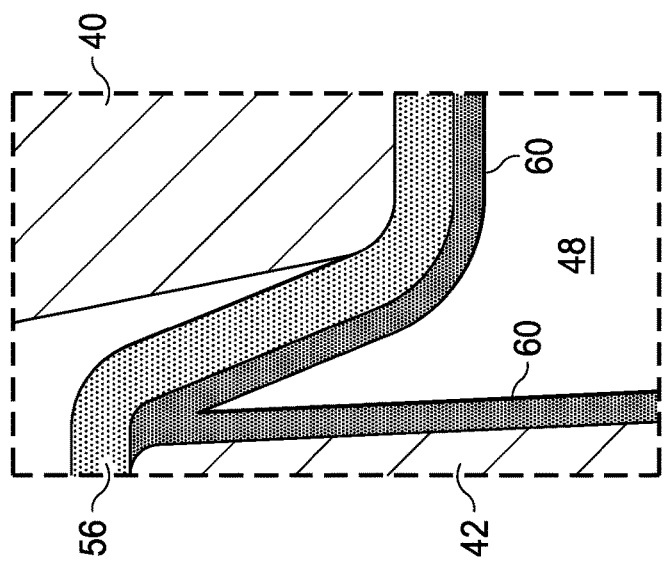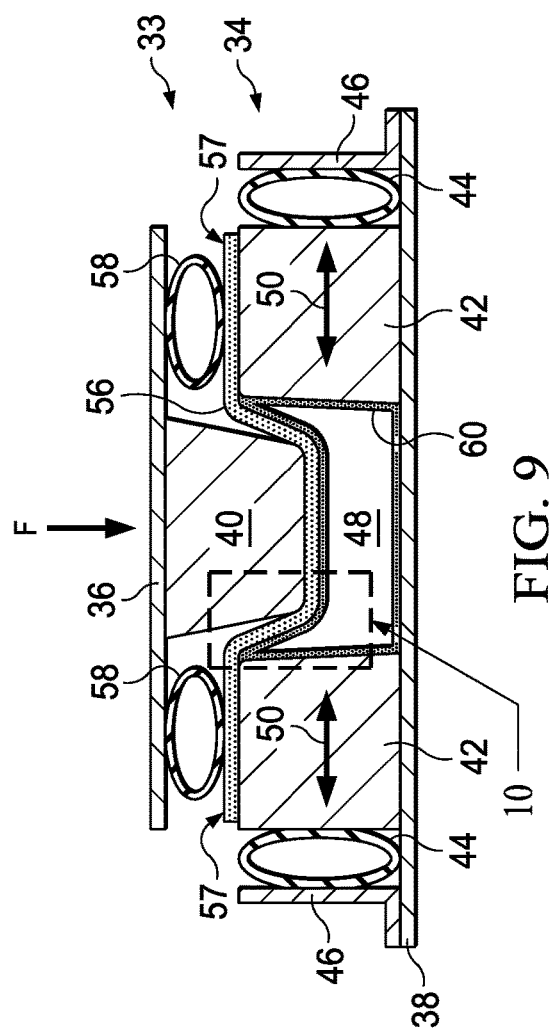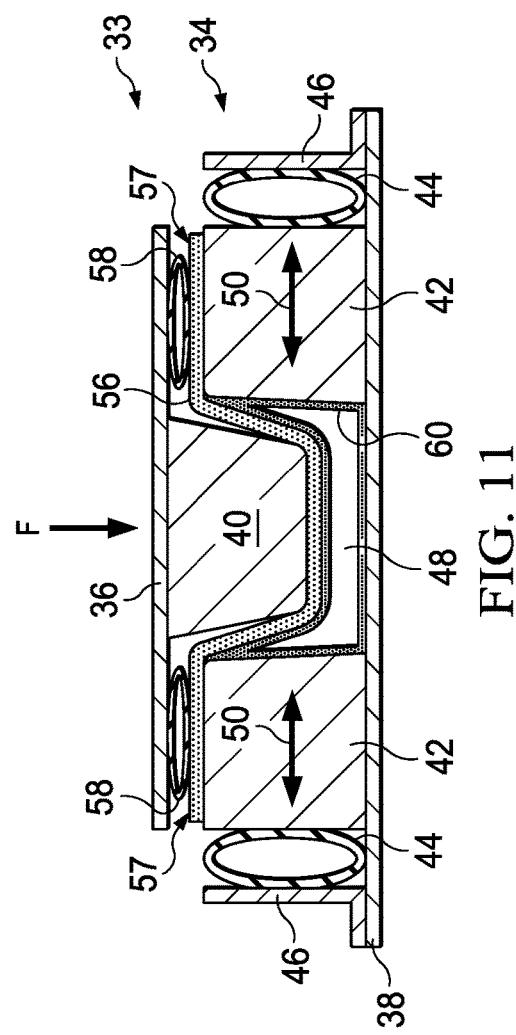

CONSTRAINED FORMING OF CONTOURED COMPOSITE HAT STRINGERS

CROSS-REFERENCE TO RELATED APPLICATIONS

This application is a Divisional Application of U.S. patent application Ser. No. 17/447,593, filed Sep. 14, 2021, which claims the benefit of U.S. Provisional Patent Application Ser. No. 63/079,805, filed Sep. 17, 2020, both of which are herein incorporated by reference in their entirety.

BACKGROUND INFORMATION

1. Field

The present disclosure generally relates to methods and equipment for making composite stiffeners, and deals more particularly with a method and apparatus for making contoured composite hat stringers having reduced wrinkling.

2. Background

Various processes and equipment may be used to form a flat composite charge into a stiffener such as a stringer having a desired cross-sectional shape. For example, stringers may be made by forming the composite charge into a die cavity using a punch or inflatable bladder. In those applications where the stringer is contoured long its length as part of the forming process, stresses are locally created within the composite charge during forming that may result in buckling or wrinkling in the areas of the stringer containing these stresses. In the case of a contoured stringer having a hat-shaped cross section ("hat stringer"), the stresses tend to form in the contoured regions of the stringer, and cause buckling or wrinkling of the cap. Buckling or wrinkling of the cap is undesirable because it may affect the structural performance of the stringer, resulting in the need for stringer rework or alteration of the stringer design that may increase labor and/or material costs.

Accordingly, it would be desirable to provide a method and apparatus for making contoured hat stringers that reduces or eliminates buckling and/or wrinkling of the cap, particularly in contoured sections of the stringer.

SUMMARY

The disclosure relates in general to manufacturing composite parts, and more specifically to methods and apparatus for producing contoured composite hat stringers having reduced wrinkling.

According to one aspect, a method is provided of forming a contoured composite hat stringer having a contoured hat section including sides and a cap. The method comprises forcing a composite charge into a die cavity with a punch. The method further comprises constraining the cap between an inflatable bladder and the punch as the composite charge is being forced into the die cavity. The method further comprises applying pressure to outer edges of the composite charge with a pair of inflatable pinch bladders.

According to another aspect, a method is provided of forming a contoured composite hat stringer having reduced wrinkling. The method comprises forming a composite charge into a contoured hat section having sides and a cap by forcing the composite charge into a die cavity. The method further comprises reducing stress in the cap during the forming by constraining the cap as the composite charge is being formed.

According to still another aspect, a method is provided of forming a contoured composite hat stringer having a hat section including sides and a cap. The method comprises placing a flat composite charge on a pair of dies defining a die cavity, and forcing the flat composite charge into the die cavity to form a hat section of the stringer having sides and a cap. The method further comprises contouring the die cavity, and reducing wrinkling of the cap during forming of the hat section by transferring stress in the cap away from the cap.

One of the advantages of the disclosed method and apparatus is that contoured composite hat stringers can be produced in which wrinkling in contoured areas of the cap is reduced or eliminated. Another advantage is that the method can be implemented with only minor modifications of existing stringer forming equipment. Still another advantage is that rework and attendant labor and material costs caused by stringer wrinkling may be reduced or eliminated. A further advantage is that reduced cap wrinkling may lead to improved structural performance of hat stringers.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

FIG. 4 is an illustration of a perspective view of a composite hat stringer having multiple contours along its length.

FIG. 5 is an illustration of a cross-sectional view of tool set used to make a contoured composite hat stringer.

FIG. 5A is an illustration of a perspective view of the top plate and punch of the tool set shown in FIG. 5.

FIG. 6 is an illustration of a cross-sectional view showing an alternate means of moving the dies forming part of the tool set shown in FIG. 5.

FIG. 7 is an illustration similar to FIG. 5 but showing a flat composite charge having been placed on the dies and a deflated bladder installed within the die cavity.

FIG. 8 is an illustration of a perspective view of the deflated bladder shown in FIG. 7.

FIG. 9 is an illustration similar to FIG. 7 but showing the bladder having been inflated and a punch having partially formed the composite charge into the die cavity.

FIG. 10 is an illustration of the area designated as "FIG. 10" in FIG. 9.

FIG. 11 is an illustration of a view similar to FIG. 9, but showing the punch having fully formed the composite charge into the die cavity.

DETAILED DESCRIPTION

Figure 1:
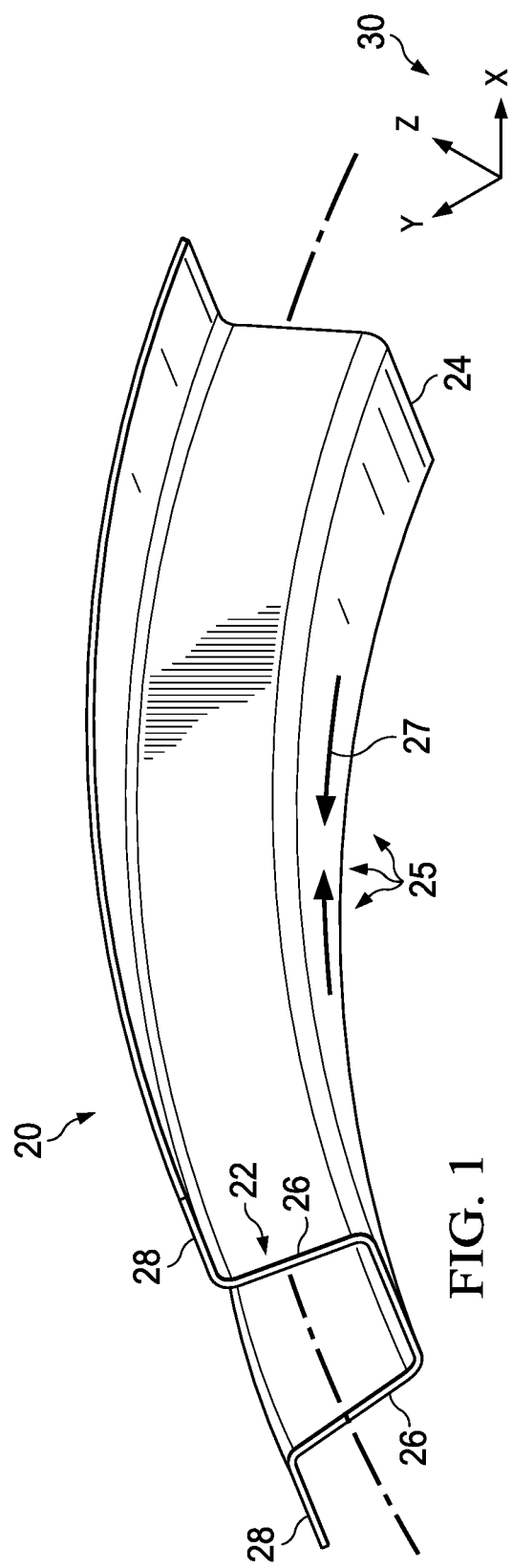
FIG. 1 is an illustration of a perspective view of one example of a composite hat stringer.
Figure 3:
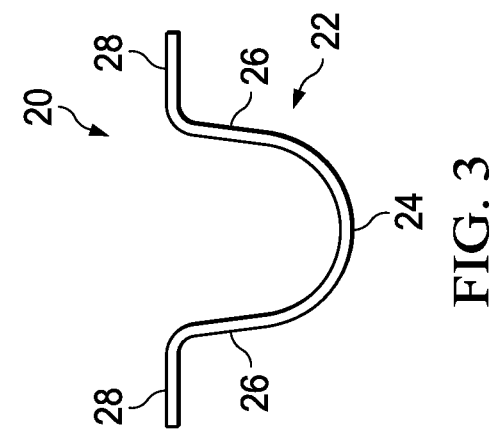
FIG. 3 is an illustration of an end view showing the cross-sectional shape of another example of a composite hat stringer.
Figure 2:
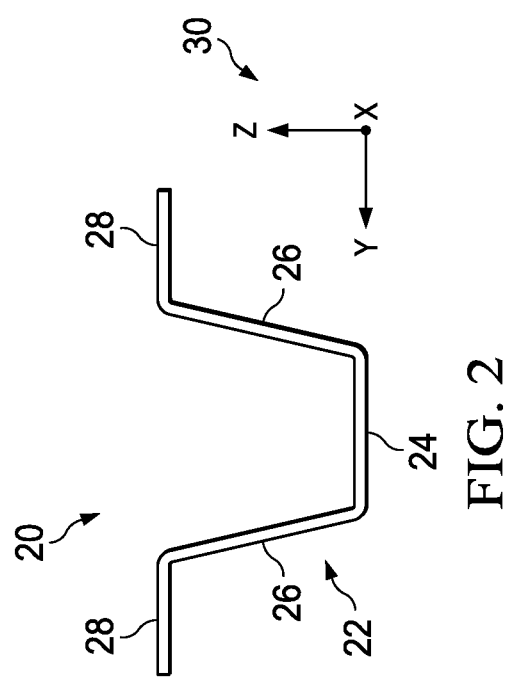
FIG. 2 is an illustration of an end view showing the cross-sectional shape of the composite hat stringer shown in FIG. 1.

Referring first to FIGS. 1 and 2, a hat stringer 20 having one or more out-of-plane curvatures comprises a hat section 22 and a pair of outwardly turned flanges 28. The hat section 22 includes a substantially flat cap 24 coupled with the flanges 28 by a pair of inclined sides 26, sometimes referred to as webs. The hat stringer 20 may possess other cross sectional shapes. For example, FIG. 3 illustrates a hat stringer 20 having a hat section 22 with a rounded cap 24 that smoothly transitions into the sides 26.

The hat stringer 20 may comprises a composite laminate formed of multiple plies of a fiber reinforced polymer such as a thermoset or thermoplastic. As will be discussed below, the hat stringer 20 may have one or more out-of-plane contours or curvatures along its length. In the example shown in FIG. 1, the hat stringer 20 possesses a single constant curvature in the X-Z plane within the coordinate system shown at 30. FIG. 4 illustrates another example of a hat stringer 20 having contours in both the X-Z and X-Y planes. Referring particularly to FIG. 1, as will be discussed later, during forming of the hat stringer 20 to the desired cross-sectional shape, regions 25 of the cap 24 along inside radius of the hat section 22 may be placed in compression 27 as a result of the forming and contouring process. In one example, contouring of the hat stringer 20 occurs as the hat stringer is being formed to the desired cross section shape. Alternatively, in another example, the hat stringer 20 is contoured along its length in a separate operation after it has been formed to the desired cross sectional shape. In each of these examples, due to the contouring, the cap 24 is placed in compression 27 along the regions 25 of its length that are contoured. Compression 27 of the cap 24 in this manner during stringer forming may cause the cap 24 to buckle or wrinkle.

Attention is now directed to FIGS. 5-11, which illustrate an apparatus 33 for forming a flat composite charge 56 into a contoured hat stringer 20 having reduced wrinkling of the cap 24. The apparatus 33 includes a tool set 34 comprising a punch 40, and a pair of dies 42 that are spaced apart to form a die cavity 48. Referring to FIG. 5, the punch 40 may be segmented along its length to allow it to flex, and is mounted on the bottom of a flexible top plate 36. The cross sectional shape of the punch 40 substantially matches the IML (inner mold line) of the hat section 22 (FIG. 2). In other examples of the tool set 34, an inflatable bladder (not shown) may be used in lieu of the punch 40 to form the flat composite charge 56 down into the die cavity 48. The tool set 34 may be installed in a press (not shown) having press platens (not shown) that move the top and bottom plates 36, 38 relative to each other, causing displacement of the punch 40 into the die cavity 48 at a desired rate and with a desired amount of force F.

The dies 42 are mounted for lateral movement 50 on a flexible bottom plate 38. In one example, the dies 42 are segmented along their lengths, allowing them to flex out-of-plane. In another example, the dies 42 may each comprise a series of individual die blocks (not shown), likewise permitting the dies 42 to flex out-of-plane. A pair of side rails 46 are secured to the bottom plate 38, outboard of the dies 42. Inflatable side bladders 44 are respectively located between the dies 42 and the side rails 46. The side bladders 44 may be inflated with a fluid such as air, and function to control the outward lateral movement of the dies 42 during the forming process. In other examples, as shown in FIG. 6, a mechanical actuator 52 or similar mechanism coupled with each of the dies 42 by a drive rod 54 may be employed to control lateral movement of the dies 42.

Referring to FIGS. 7 and 8, an inflatable pinch bladder 60 is installed within the die cavity 48 which may rest on the bottom plate 38 until it is inflated with air or another suitable pressurized fluid. The cap pinch bladder 60 may be formed of any suitable material such as an elastomer having rigidity that is sufficient to apply pressure to and constrain the cap 24 of the hat section 22 during the forming process. In order to achieve the required rigidity, in some examples, the cap pinch bladder 60 may include local reinforcements (not shown). In the illustrated example, the cap pinch bladder 60 is sized to completely fill the die cavity 48, extends along the entire length of the die cavity 48. However in other examples, the pinch bladder 60 may be located in only a section of the die cavity 48 where compression of the cap 24 may be sufficient to cause buckling or wrinkling of the cap 24.

A stringer forming operation begins with the tool set 34 arranged as shown in FIG. 5, with the punch 40 in a raised position. Next, as shown in FIG. 7, the cap pinch bladder 60 is installed within the die cavity 48 in a deflated or partially deflated condition. Then, a flat composite charge 56 is placed on the dies 42, spanning the die cavity 48. Next, a pair of flange pinch bladders 58 are installed between the outer edges 57 of the composite charge 56 and the top plate 36. The flange pinch bladders 58 may be pressurized with air or other suitable fluid, and as will be described below, function to pinch the outer edges 57 of the composite charge 56 against the dies 42 as the punch 40 "punches" the composite charge 56 down into the die cavity 48.

To perform a forming operation, the top plate 36 moves down, causing the punch 40 to initially contact the composite charge 56. Immediately prior to the punch 40 contacting the composite charge 56, the cap pinch bladder 60 is inflated, causing it to come into contact with and apply pressure against the bottom of the composite charge 56. Continued downward movement of the top plate 36 (FIGS. 9 and 10) causes the punch 40 to begin forming the composite charge 56 into the die cavity 48. As the composite charge 56 is being formed into the die cavity 48, the flange pinch bladders 58 apply pressure to the outer edges 57 of the composite charge 56, holding them flat against the dies 42, while allowing them to slip over the dies 42 during the remainder of the forming process.

As the punch 40 forms the composite charge 56 into the die cavity 48, the pressurized cap pinch bladder 60 bears against and applies pressure on the cap 24, thereby restraining the cap 24 against buckling or wrinkling. Continued movement of punch 40 into the die cavity 48 results in the cap pinch bladder 60 moving onto and applying pressure to the sides 26 of the hat section 22 (see FIG. 10), until eventually the entire area of the hat section 22 is nearly enveloped and constrained by the cap pinch bladder 60 (FIG. 11). Depending on the application, it may be necessary to coordinate the level of pressurization of the cap pinch bladder 60 with the desired rate of movement of both the punch 40 and the dies 42 to achieve optimum results.

Figure 14:
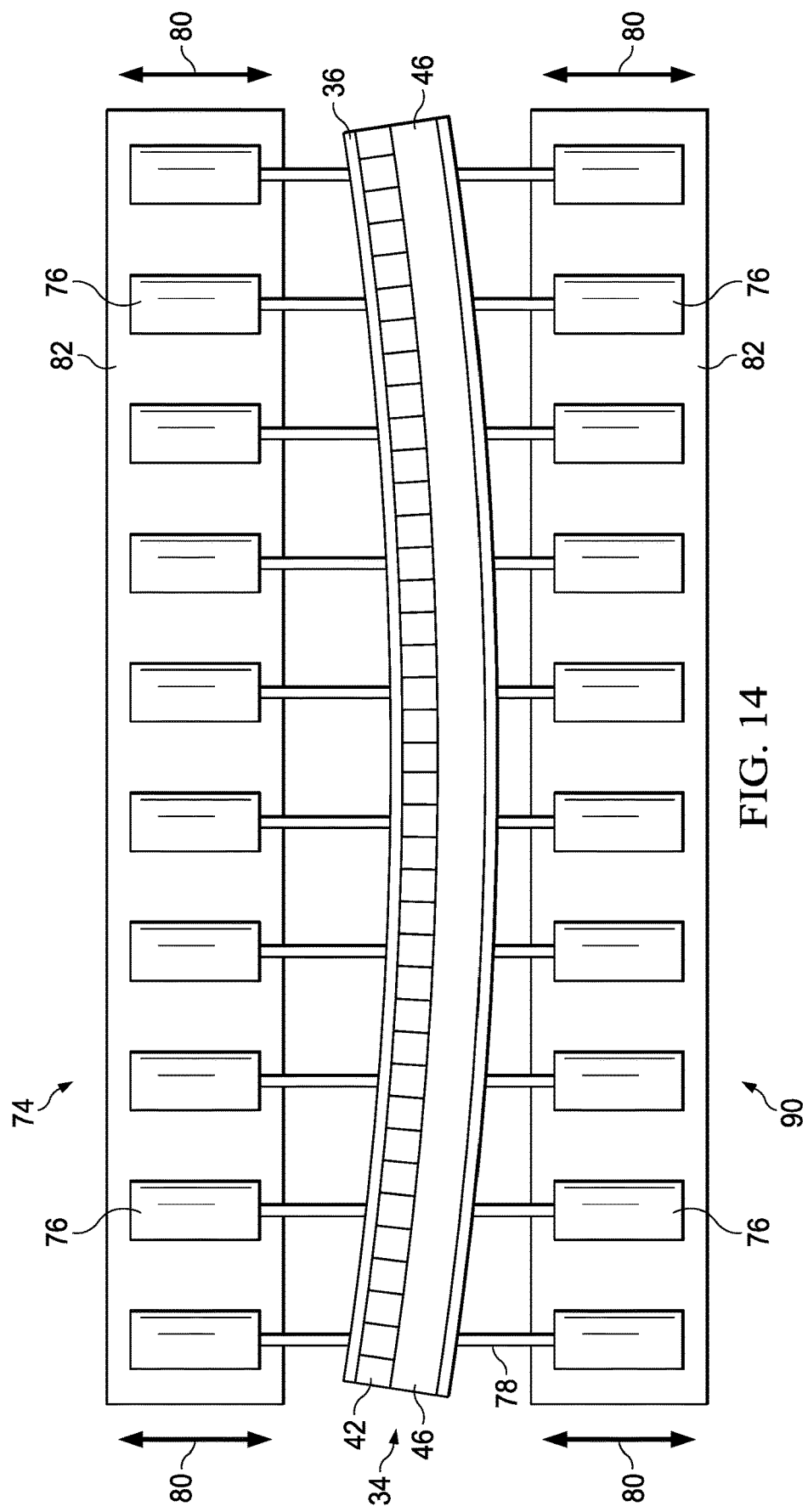
FIG. 14 is an illustration of a side view of a contour changing mechanism used to contour the composite hat stringer.

In one example, as previously mentioned, prior to forming the composite charge 56 to the desired cross-section, the tool set 34 is contoured along its length using, for example, a later discussed contour changing mechanism 74 (FIG. 14). Consequently, in this example of the forming sequence, the composite charge 56 is formed into the die cavity 48 that has been previously contoured along its length, consequently, compression of contoured regions 25 of the cap 24 occurs as the cross-sectional shape of the hat section 22 is being formed. In another example of the forming sequence, the composite charge 56 is formed into the die cavity before the tool set (including the die cavity 48) is contoured along its length. In this latter example, compression of the contoured regions 25 of the cap 24 occurs after the cross-sectional shape of the hat section 22 has been formed, as the hat section 22 is being formed to its final contour along its length. Regardless of which of these forming sequences is used, the cap pinch bladder constrains the cap 24, causing stresses in the cap 24 caused by compression to be swept away to other areas of the hat section 22 that may not subject to buckling or wrinkling.

Figure 12:
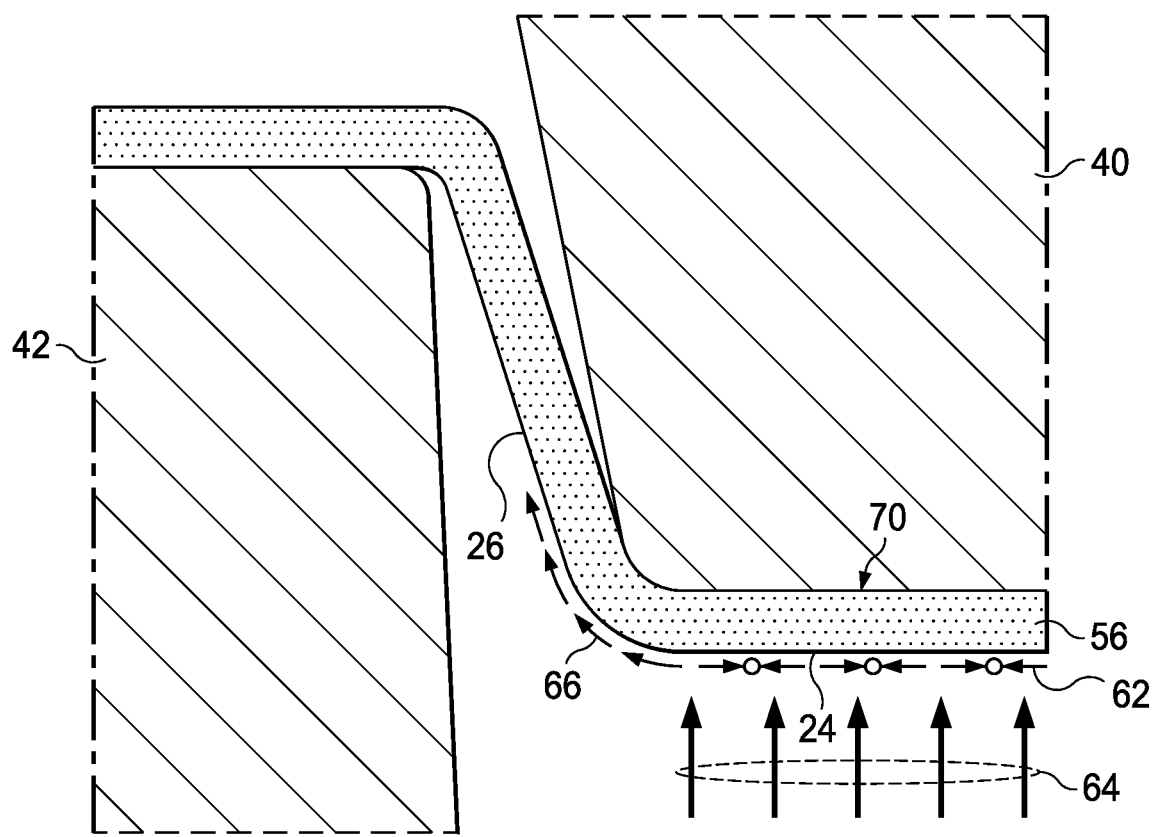
FIG. 12 is an illustration similar to FIG. 10 useful in explaining the benefit of constraining the cap during the forming process, the cap pinch bladder not shown for clarity.

FIG. 12 graphically illustrates how the use of the cap pinch bladder 60 reduces or eliminates wrinkling of the cap 24 when forming the hat stringer 20 to a desired contour. As previously discussed, when forming the hat section 22 within contoured regions of the hat stringer 24, the cap 24 is placed in compression, resulting in the creation of stresses 62 within the cap 24 that can cause buckling or wrinkling of the cap 24. To prevent such buckling or wrinkling, the force 64 applied to the cap 24 by the cap pinch bladder 60 constraints cap 24, forcing the cap stresses 62 to shift 66 and spread to other locations in the hat section 22 that are not be subject to buckling or wrinkling. For example, the cap stresses 62 may shift 66 onto the sides 26 of the hat section 22, or may shift longitudinally along the cap 24 to cap regions where the cap 24 is not under compression. In other words, the constraint imposed on the cap 24 by the cap pinch bladder 60 effectively relieves these stresses by sweeping them to other areas of the hat stringer 20.

Figure 13:
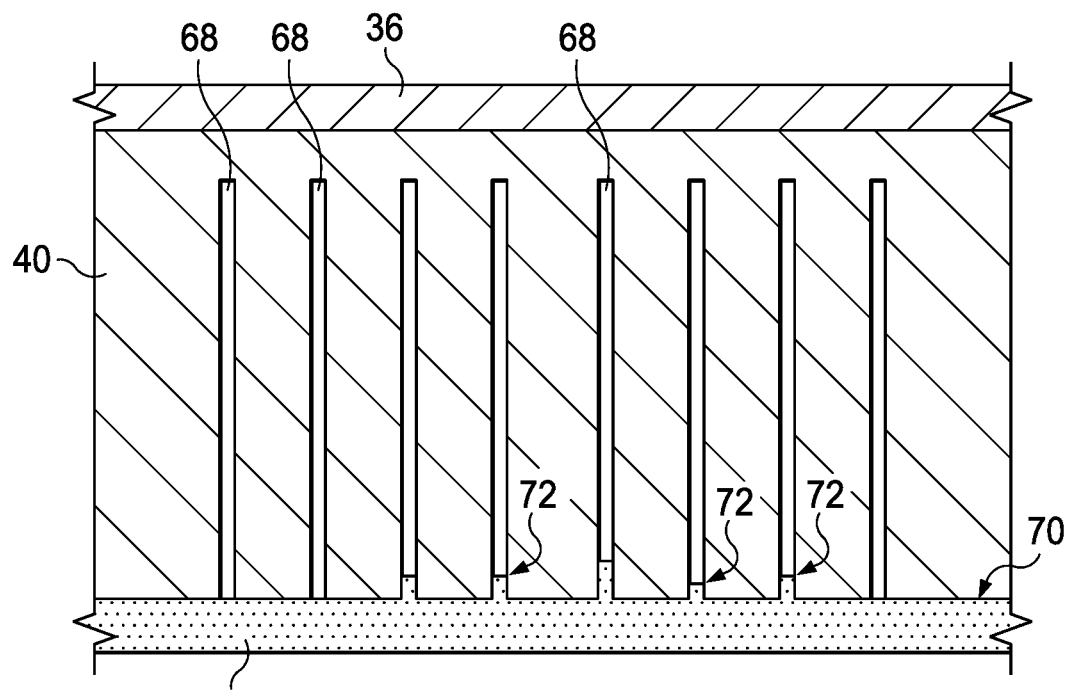
FIG. 13 is an illustration of a fragmentary, side view of a portion of the punch in which the constraining influence of the bladder has forced localized strain of the composite charge into slits in the punch.

Referring to FIG. 13, the force 64 applied to the cap 24 by the cap pinch bladder 60 in contoured regions 25 of the hat section 22 causes material in the composite charge 56 that is in contact with the punch 40 to strain 72 into at least some of the slits 68 in the punch 40. Strain of the material within the cap 24 into the slits 68 assists in relieving some of the stress 62 in the cap 24, further reducing the possibility of buckling or wrinkling of the cap 24.

Various mechanisms may be used to configure the tool set 34 for forming one or more out-of-plane contours in the hat stringer 20. FIG. 14 illustrates one example of a contour changing mechanism 74 used to configure the tool set 34 to form a hat stringer 20 that is contoured along its length in the X-Z plane (FIGS. 1 and 2). The contour changing mechanism 74 may comprise, for example and without limitation, a press 90. The press 90 includes a plurality of individual, spaced apart actuators 76 respectively mounted on opposite press plates 82 that are adapted for movement toward and away from each other, as indicated by the arrows 80. The tool set 34 is positioned between the press plates 82. The press plates 82 may be coupled with any suitable power operated mechanisms such as cylinder actuators (not shown) which displace the press plates 82 to open/close the tool set 34 during a composite charge forming operation. Each of the actuators 76 includes a drive rod 78 coupled with one of the top and bottom flexible plates 36, 38. The drive rods 78 displace the flexible top and bottom plates 36, 38 which in turn bend (contour) the dies 42, thereby contouring the hat stringer 20. As previously discussed, the dies 42 may be contoured before the composite charge 56 is "punched" into the die cavity 48. Alternatively, however, the composite charge 56 may be punched into the die cavity 48 after the dies 42 have been contoured by the contour changing mechanism 74.

Figure 15:
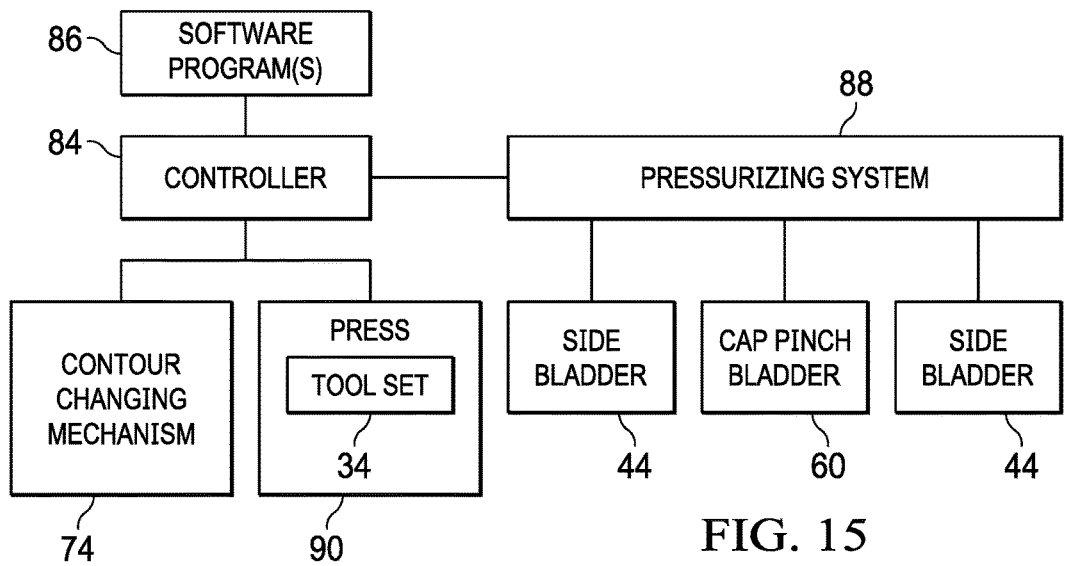
FIG. 15 is an illustration of a functional block diagram of apparatus for producing contoured composite hat stringers having reduced wrinkling.

Attention is now directed to FIGS. 15, broadly illustrates the components of an apparatus 33 for making contoured hat stringers 20 with reduced cap wrinkling. A controller 84 is coupled with and is operable to control operation of the press 90, the contour changing mechanism 74, as well as a pressurizing system 88. The controller 84 may comprise a PC (personal computer) or a programmable controller operating under the control of one or more software programs 86. A pressurizing system 88 may comprise any suitable pump and fluid reservoir (not shown) that are operable to independently pressurize/depressurize (inflate/deflate) the side bladders 44, flange pinch bladders 58, and the cap pinch bladder 60. The controller 84 controls and coordinates operation of the contour changing mechanism 74, the press 90 and a pressurizing system 88, such that the forming and contouring processes are carried out at a controlled rate. The controller 84 may also coordinate and synchronize inflation of the cap pinch bladder 60 with the movement of the punch 40 and the dies 42.

Figure 16:
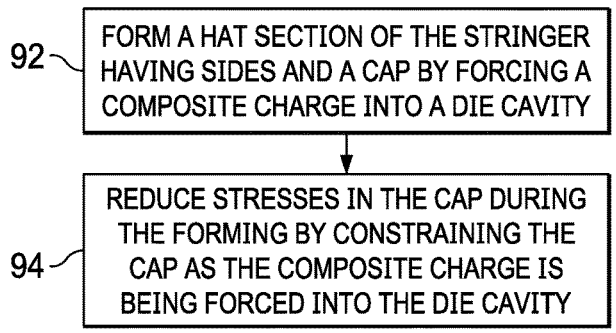
FIG. 16 is an illustration of a flow diagram of a method of making contoured composite hat stringers having reduced wrinkling.

FIG. 16 broadly illustrates the steps of a method of making composite hat stringers 20 with reduced wrinkling. Beginning at 92, a hat section 22 of the stringer having sides 26 and a cap 24 is formed by forcing a composite charge 56 into a die cavity 48. At 94, stresses in the cap 24 produced during the forming are reduced by constraining cap 24 the as a composite charge 56 is being forced into the die cavity 48.

Figure 17:
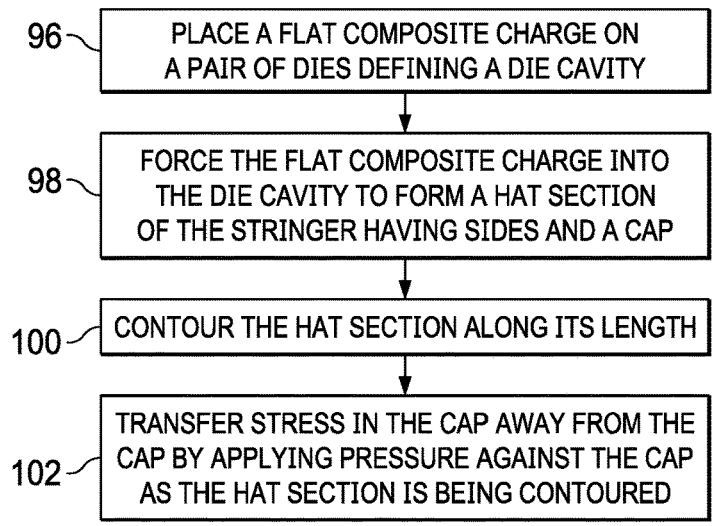
FIG. 17 is an illustration of a flow diagram of another method of making contoured composite hat stringers having reduced wrinkling.

FIG. 17 illustrates the steps of another example of a method of making composite hat stringers 20 possessing a hat section 22 having a cap 24 and sides 26. At 96, a flat composite charge 56 is placed on a pair of dies 42 defining a die cavity 48 therebetween. At 98, the flat composite charge 56 is forced into the die cavity 48 to form a hat section 22 of the hat stringer 20 having a cap 24 and sides 26. At 100, the hat section 22 is contoured along its length. At 102, stresses in the cap 24 are directed away from the cap 24 by applying pressure against the cap 24 as the hat section 22 is being contoured.

Figure 18:
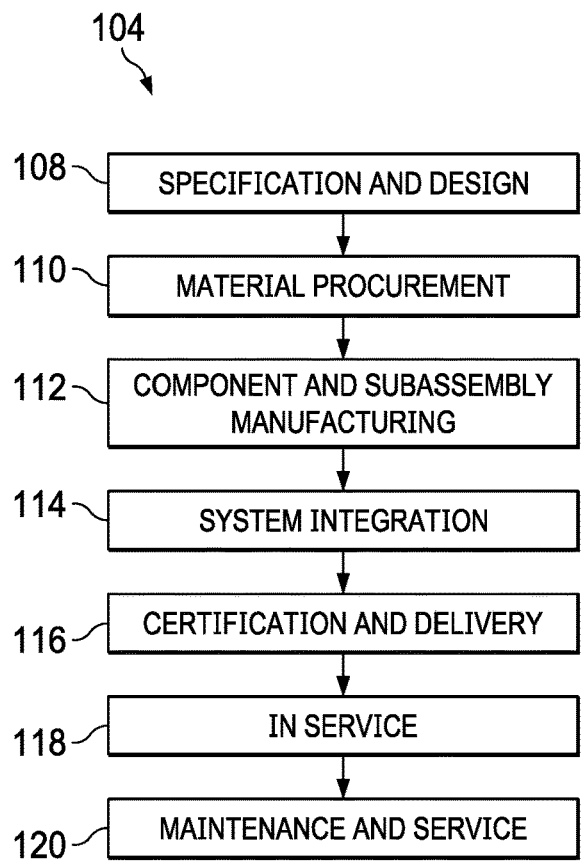
FIG. 18 is an illustration of a flow diagram of aircraft production and service methodology.
Figure 19:
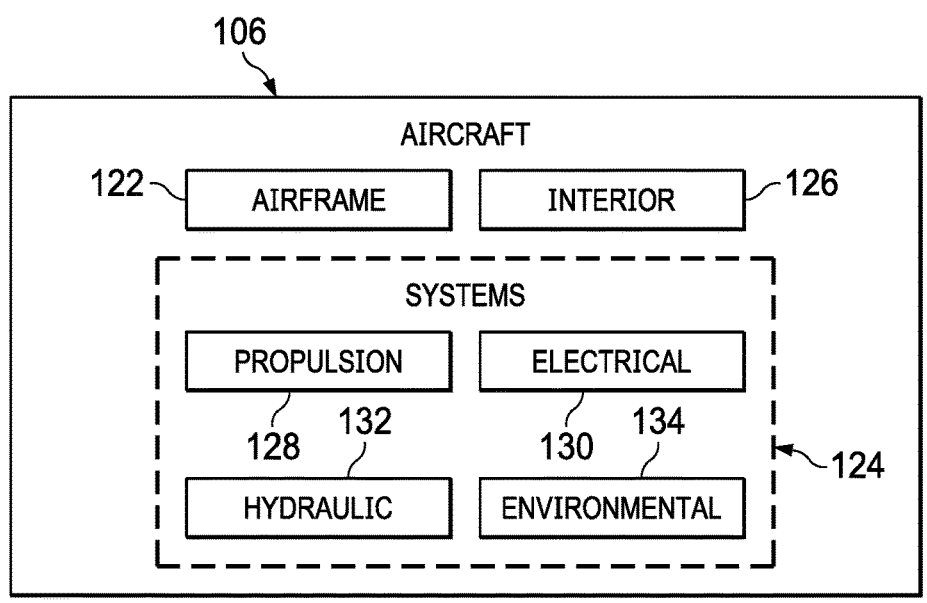
FIG. 19 is an illustration of a block diagram of an aircraft.

Examples of the disclosure may find use in a variety of potential applications, particularly in the transportation industry, including for example, aerospace, marine, automotive applications and other application where hat stringers may be used. Thus, referring now to FIGS. 18 and 19, examples of the disclosure may be used in the context of an aircraft manufacturing and service method 104 as shown in FIG. 18 and an aircraft 106 as shown in FIG. 19. Aircraft applications of the disclosed examples may include a variety of contoured hat-type stringers used the airframe 122 of the aircraft 106. During pre-production, exemplary method 104 may include specification and design 108 of the aircraft 106 and material procurement 110. During production, component and subassembly manufacturing 112 and system integration 114 of the aircraft 106 takes place. Thereafter, the aircraft 106 may go through certification and delivery 116 in order to be placed in service 118. While in service by a customer, the aircraft 106 is scheduled for routine maintenance and service 120, which may also include modification, reconfiguration, refurbishment, and so on.

Each of the processes of method 104 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 106 produced by exemplary method 104 may include an airframe 122 with a plurality of systems 124 and an interior 126. Examples of high-level systems 124 include one or more of a propulsion system 128, an electrical system 130, a hydraulic system 132 and an environmental system 134. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 206. For example, components or subassemblies corresponding to production process 112 may be fabricated or manufactured in a manner similar to components or subassemblies produced while the aircraft 106 is in service. Also, one or more apparatus examples, method examples, or a combination thereof may be utilized during the production processes 112 and 1114, for example, by substantially expediting assembly of or reducing the cost of an aircraft 106. Similarly, one or more of apparatus examples, method examples, or a combination thereof may be utilized while the aircraft 106 is in service, for example and without limitation, to maintenance and service 120.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of forming a contoured composite hat stringer having a contoured hat section including sides and a cap, comprising:

placing a composite charge on a pair of dies mounted to a flexible bottom plate, the pair of dies forming a die cavity;

installing an inflatable bladder within the die cavity, the inflatable bladder resting on the flexible bottom plate;

inflating the inflatable bladder to completely fill the die cavity;

forcing the composite charge into the die cavity with a punch mounted to a flexible top plate, the punch in contact with a first side of the composite charge;

constraining the cap between the inflated bladder and the punch as the composite charge is being forced into the die cavity, the inflated bladder in contact with the cap from a second side of the composite charge; and applying pressure to outer edges of the composite charge with a pair of inflatable flange pinch bladders, the pair of inflatable flange pinch bladders positioned between the outer edges of the composite charge and the flexible top plate and in contact with the first side of the composite charge, wherein the applying pressure includes allowing the outer edges of the composite charge to slip over the pair of dies during the forcing the composite charge into the die cavity.

2. The method of claim 1, wherein forcing the composite charge into the die cavity includes using the punch to punch the composite charge into the die cavity while constraining the cap.

3. The method of claim 2, further comprising:

using the pair of dies to apply pressure to the sides of the contoured hat section as the composite charge is being punched into the die cavity.

4. The method of claim 2, further comprising:

contouring the contoured hat section along a length of the contoured hat section.

5. The method of claim 1, wherein constraining the cap includes:

using the inflated bladder to apply a force against the cap.

6. The method of claim 1, wherein constraining the cap comprises:

causing the inflated bladder to contact the second side of the composite charge prior to forcing the composite charge into the die cavity with the punch.

7. The method of claim 1, wherein constraining the cap includes:

constraining the entire area of the contoured hat section including the sides and the cap.

8. A method of forming a contoured composite hat stringer having reduced wrinkling, comprising:

placing a composite charge on a pair of dies, the pair of dies forming a die cavity;

installing an inflatable bladder within the die cavity;

inflating the inflatable bladder to completely fill the die cavity and contact the composite charge;

forming the composite charge into a contoured hat section having sides and a cap by forcing the composite charge into the die cavity; and reducing stress in the cap during the forming by constraining the cap with the inflated bladder as the composite charge is being formed.

9. The method of claim 8, wherein forcing the composite charge into the die cavity includes using a punch to punch the composite charge into the die cavity while constraining the cap.

10. The method of claim 9, further comprising:

using the pair of dies to apply pressure to the sides of the contoured hat section as the composite charge is being punched into the die cavity.

11. The method of claim 9, further comprising:

contouring the contoured hat section along a length of the contoured hat section.

12. The method of claim 8, wherein constraining the cap includes:
using the inflated bladder to apply a force against the cap.

13. The method of claim 8, wherein inflating the inflatable bladder is performed before forcing the composite charge into the die cavity.

14. The method of claim 8, wherein:
forming the contoured hat section includes contouring regions of the contoured hat section along a length of the contoured hat section, wherein the forming produces stresses in the cap along the regions, and
reducing the stresses in the cap includes sweeping the stresses from the cap in the regions to other areas of the contoured hat section.

15. A method of forming a contoured composite hat stringer having a hat section including sides and a cap, comprising:
placing a flat composite charge on a pair of dies defining a die cavity;
installing an inflatable bladder within the die cavity;
inflating the inflatable bladder to completely fill the die cavity and contact the flat composite charge;
forcing the flat composite charge into the die cavity to form a hat section of the contoured composite hat stringer having sides and a cap;
constraining the cap with the inflated bladder as the flat composite charge is being forced into the die cavity;
contouring the die cavity; and
reducing wrinkling of the cap during forming of the hat section by transferring stress in the cap away from the cap.

16. The method of claim 15, wherein reducing wrinkling of the cap includes constraining the cap with the inflated bladder.

17. The method of claim 15, wherein transferring stress away from the cap includes applying pressure against the cap with the inflated bladder from within the die cavity.

18. The method of claim 15, wherein the contouring is performed before forcing the flat composite charge into the die cavity.

19. The method of claim 15, wherein the contouring is performed after forcing the flat composite charge into the die cavity.

20. The method of claim 15, wherein applying pressure against the cap is performed by:
using the inflated bladder to apply a force to the cap.

* * * * *